Figure 1:
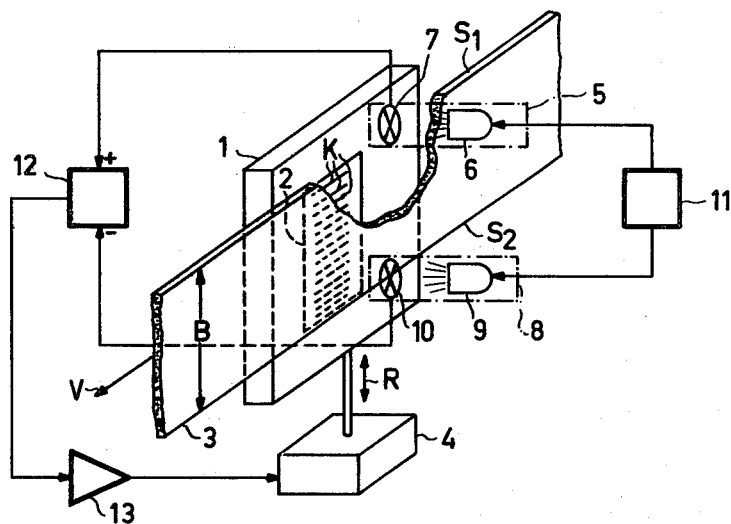

United States Patent [19]

de Niet et al.

[11] 4,176,381
[45] Nov. 27, 1979

[54] RECORDING AND/OR REPRODUCING APPARATUS FOR A MAGNETIC RECORD CARRIER IN THE FORM OF A TAPE, PROVIDED WITH A CONTROL SYSTEM FOR THE MAGNETIC HEAD POSITION

[75] Inventors: Edmond de Niet; Albert M. A. Rijckaert, both of Eindhoven, Netherlands

[73] Assignee: U.S. Philips Corporation, New York, N.Y.

[21] Appl. No.: 951,688

[22] Filed: Oct. 16, 1978

[30] Foreign Application Priority Data

Nov. 11, 1977 [NL] Netherlands ................... 7712418

[51] Int. Cl.$^2$ ................................... G11B 21/10
[52] U.S. Cl. ............................................. 360/77
[58] Field of Search ................................. 360/77

[56] References Cited
U.S. PATENT DOCUMENTS

| | | | |
|---|---|---|---|
| 3,945,037 | 3/1976 | Johnson | 360/77 |
| 4,123,788 | 10/1978 | Kruger | 360/77 |

Primary Examiner—Robert S. Tupper
Attorney, Agent, or Firm—Thomas A. Briody; William J. Streeter; Simon L. Cohen

[57] ABSTRACT

A recording and/or reproducing apparatus for a record carrier in the form of a tape, with a plurality of parallel longitudinal tracks. The apparatus comprises positioning means for controlling the position of the write/read head transverse to the direction of movement of the record carrier. The control signal for these positioning means is obtained with the aid of two optical systems, which each comprise a light-emitting element for emitting a radiation beam which is aimed at one edge of the record carrier and a light-receiving element for picking up the amount of light which shines past said record carrier, at least one of the elements of each optical system being rigidly connected to the write/read head. A detection device is coupled to the two light-receiving elements, which device derives the desired control signal from the amounts of light received by these two light-receiving elements.

7 Claims, 5 Drawing Figures

RECORDING AND/OR REPRODUCING APPARATUS FOR A MAGNETIC RECORD CARRIER IN THE FORM OF A TAPE, PROVIDED WITH A CONTROL SYSTEM FOR THE MAGNETIC HEAD POSITION

The invention relates to apparatus for recording and/or reproducing information in a plurality of parallel longitudinal tracks on a magnetic record carrier in the form of a tape, which apparatus comprises a magnetic head which is adapted to cooperate with the record carrier which is passed along said magnetic head, positioning means for controlling the relative position of said magnetic head with respect to the record carrier in a direction transverse to the direction of transport of the record carrier and in a plane parallel to the tangent plane of the record carrier with the magnetic head, and control means for the generation and application to the positioning means of a control signal which is representative of the difference between the instantaneous and the desired position of the magnetic head.

In multichannel magnetic recording and/or reproducing apparatus with a magnetic record carrier in the form of a tape and a (multichannel) magnetic head, information being recorded and/or read in a plurality of longitudinal tracks on the record carrier, it is essential during information read-out that the magnetic head occupies a correct position relative to the tracks on the record carrier. The accuracy with which said magnetic head is positioned relative to the tracks dictates the distance to be maintained between adjacent tracks on the record carrier and thus also determines the efficiency of the information storage, i.e. the amount of information which can be stored per unit area of the record carrier.

The width of the tracks and the track distances are being reduced continually in order to increase the information density. As an example, systems have been developed in which the record carrier contains over 100 tracks with a track width of approximately 40 $\mu$m and a track distance of 10 $\mu$m. It will be evident that such systems impose very stringent requirements in respect of the position of the magnetic head.

In order to meet these stringent positional requirements servo systems of the type mentioned in the preamble have been developed, which serve for very accurately controlling the position of the magnetic head in a direction transverse to the direction of transport of the record carrier, Such a system is for example known from British Patent 1,260,706. The system for positioning the magnetic head described in this Patent Application employs reference tracks on the record carrier which are scanned by additional magnetic heads, the signals supplied by said additional magnetic heads being processed into a measuring signal which is representative of the position of the magnetic head relative to the record carrier.

The use of such a measuring system has some significant disadvantages. The major disadvantage is the fact that when such a system is used the available information capacity on the record carrier cannot be utilized in an optimum manner. This is first of all because of the fact that the reference tracks of course occupy useful information capacity on the record carrier. As a result of this it is necessary to compromise in respect of the measuring and control range of the control means and the loss of information capacity on the record carrier. When the said reference tracks are use the measuring range is namely dictated by the width of these tracks, so that a large measuring range is automatically attended by a substantial loss of information capacity on the record carrier. This loss of information capacity becomes even worse when these magnetically scanned reference tracks are used, because of the fact that the positioning means can then be operative only when the recorded information is reproduced. As a result of this, an area along the two edges of the record carrier having a width equal to or greater than the possible tape shift in the transverse direction cannot be used as information area, because owing to the fact that during recording the magnetic head position is not controlled the magnetic head which serves for recording in an information or reference track situated within said area may completely loose contact with the record carrier.

A further drawback of this known system is the sensitivity for the type and imperfections of the magnetic material used in the record carrier. Once the strength of the reference signals to be written in the reference tracks has been adjusted, the strength of the reference signals read during reproduction obviously depends on the sensitivity of the magnetic material used in the record carrier. As a result of this the gain in the control loop formed by the control means and positioning means is dependent on the type of magnetic material of the record carrier, so that it is difficult to optimise this control loop for each type of record carrier. Furthermore, any imperfections, such as for example drop-outs, in the magnetic layer of the record carrier will result in failure of the positioning of the magnetic head, which may give rise to substantial disturbances during the information read out.

Finally, this known system has the drawback that the bandwidth of the transfer characteristic of the control loop constituted by the control means and positioning means depends on the speed with which the record carrier is passed along the magnetic head, in particular the relative speed between the record carrier and the magnetic head by which the reference tracks are scanned. The maximum signal frequency which can be read by a magnetic head mainly depends on the speed with which the record carrier is moved along the magnetic head. Consequently, the known system cannot function optimally at any arbitrary speed of the record carrier, in particular at low speeds.

It is an object of the invention to provide a recording and/or reproducing apparatus provided with control and positioning means, in which, whilst maintaining an accurate positioning of the magnetic head, the disadvantages of the known system are eliminated and in particular the available information capacity on the record carrier can be utilized in an optimum manner.

For this purpose the invention is characterized in that the control means are provided with a first and a second optical system, each comprising a light-emitting element for emitting a radiation beam against one edge of the record carrier and a light-receiving element for receiving the amount of light from the radiation beam emitted by the associated light-emitting element which shines past the record carrier, at least one of the said two elements of each optical system being rigidly connected to the magnetic head, and the control means furthermore being provided with a detection device which is coupled to the light-receiving elements of the two optical systems for generating the control signal for the positioning means in dependence on the relative magnitude of the amounts of light received by the two light-receiving elements.

In contradistinction to the known system the position of the magnetic head in the apparatus in accordance with the invention is not related to reference tracks but to the two edges of the record-carrier tape. This enables the use of an optical measuring system, which includes both optical systems, for measuring the position of said magnetic head. The use of these optical systems for generating a measuring signal which is representative of the position of the magnetic head first of all has the advantage that no information capacity on the record carrier need be sacrified. Moreover, as this optical measuring system can also be operative during recording, this means that the position of the information tracks is already accurately defined during recording, so that it is no longer necessary to reserve an area along the edges of the record carrier as a safety margin, i.e. abstain from using it for information storage. This means that owing to the use of the optical measuring system practically the entire width of the record carrier can be used for information storage.

The use of an optical measuring system which cooperates with the edges of the record carrier furthermore results in a very large measuring range of the control means. In fact, this measuring range is equal to the width of the record carrier, so that a high reliability in respect of the positioning of the magnetic head is obtained.

Furthermore, this optical measuring system is independent of the type of magnetic material of the record carrier, so that the control loop, which is constituted by the control means and the positioning means, can be designed in an optimum manner independently of the type of record carrier. Moreover, the control system is insensitive to dropouts and the like in the magnetic layer of said record carrier. Finally, the frequency response of this optical measuring system is independent of the speed with which the record carrier is passed along the magnetic head, so that an optimum operation of the control loop is also ensured at an arbitrary low speed.

The operation of the system in accordance with the invention is based on the recognition that when the magnetic head is correctly positioned, the record carrier either masks exactly half the radiation beam emitted by each of the light-emitting elements or masks half of each of the light-receiving elements. The light-receiving elements of each of the optical systems then receive equal amounts of light. If there is a relative displacement between the record carrier and magnetic head in a direction transverse to the direction of transport of the record carrier, the two light receiving elements receive unequal amounts of light. The difference between the amounts of light received by these two light-receiving elements is then representative of the difference between the instantaneous and the desired position of the magnetic head and may therefore be used as control signal for the positionong means. For this, it suffices to generate an electric signal with the aid of a detection device, which signal is dependent on the relative magnitude of the amounts of light received by the two light-receiving elements.

There are several possibilities of realising the optical system and the associated detection device. In accordance with a first embodiment, each of the two optical systems comprises a light-transducer for converting the amount of light received by the light-receiving element of the relevant optical system into an electric output signal and the detection device is provided with an adder circuit for adding the output signals of the two light transducers to each other with opposite polarity and supplying the sum signal as the control signal. Furthermore, this embodiment is preferably characterized in that the light-emitting elements of the two optical systems are coupled to a modulation device for the in-phase variation of the intensity of the radiation beams emitted by the two light-emitting elements with a modulation frequency and that the detection device for obtaining the control signal comprises a synchronous detector, to which the sum signal from the adder circuit and a signal derived from the modulation device, having a frequency equal to the modulation frequency, are applied. This embodiment has the advantage that a.c. amplifiers can be used in the detection device. Suitably, this embodiment is characterized in that the detection device comprises a band-pass filter with a passband around the modulation frequency, via which band-pass filter the sum signal is applied to the synchronous detector. This ensures a satisfactory elimination of the influence of stray light in a simple manner. In these embodiments of the apparatus in accordance with the invention the light-emitting element of each of the two optical systems may consist of a light guide which is optically coupled to a common light source. Thus it is ensured that after a one-time adjustment the two light-emitting elements emit a radiation beam with the correct relative intensity ratio irrespective of variations of the intensity of the luminous energy produced by the light source.

An other preferred embodiment of the apparatus in accordance with the invention is characterized in that the light-emitting elements of the two optical systems are coupled to a modulation device for varying the intensity of the radiation beams emitted by the two light-emitting elements with a modulation frequency in phase opposition and that the detection device is adapted to supply a sum signal which represents the sum of the amounts of light received by the two light-receiving elements, whilst said detection device furthermore comprises a synchronous detector, to which this electric sum signal and a signal derived from the modulation device, having a frequency equal to the modulation frequency, are applied. In this embodiment of the apparatus in accordance with the invention the light-emitting elements of the two optical systems consequently emit a radiation beam which varies in phase opposition. The desired control signal can then be obtained by summation of the amounts of light received by the two light-receiving elements and by synchronous detection. Said summation can be obtained by converting the amounts of light received by the two light-receiving elements into electric signals with the aid of light transducers and adding these to each other. In a preferred embodiment this summation is performed optically, namely by the use of a light guide as light-receiving element for each of the two optical systems and by optically coupling these to a common light transducer.

As in these two last-mentioned preferred embodiments the light-emitting elements again emit varying light beams, it is possible again to effectively eliminate the effect of stray light by the inclusion in the detection device of a band-pass filter with a pass-band around the modulation frequency.

Figure 2:
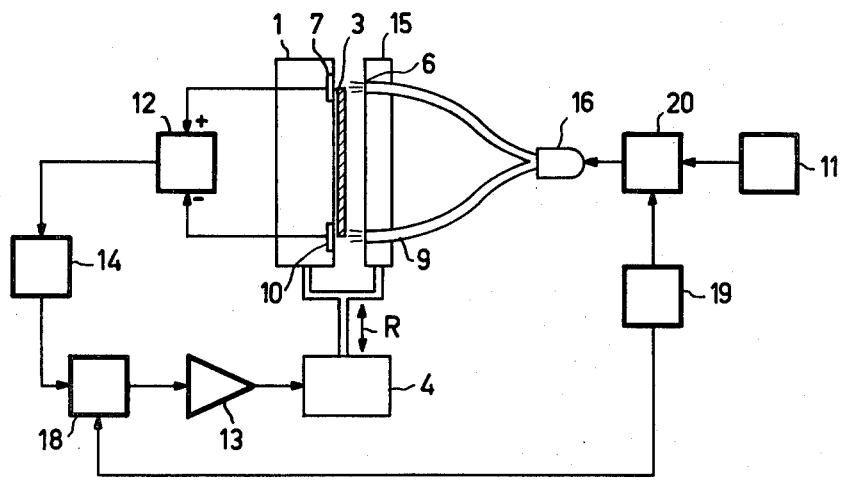
Figure 3:
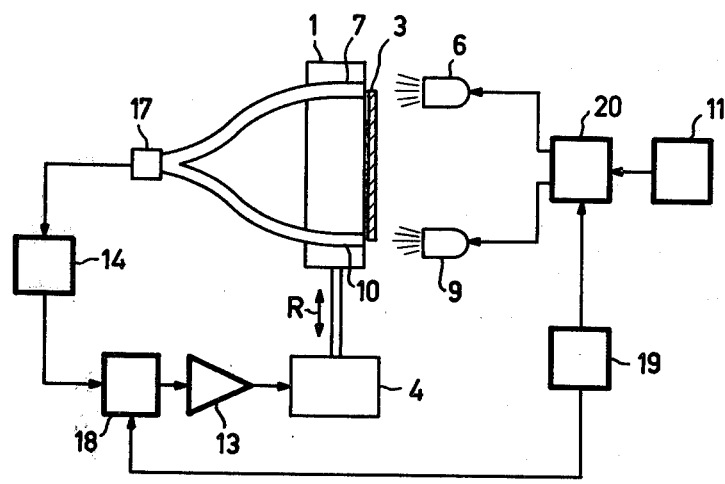

The invention will be described in more detail with reference to the drawing, in which FIGS. 1, 2 and 3 show three different embodiments of the apparatus in accordance with the invention.

Figure 4:
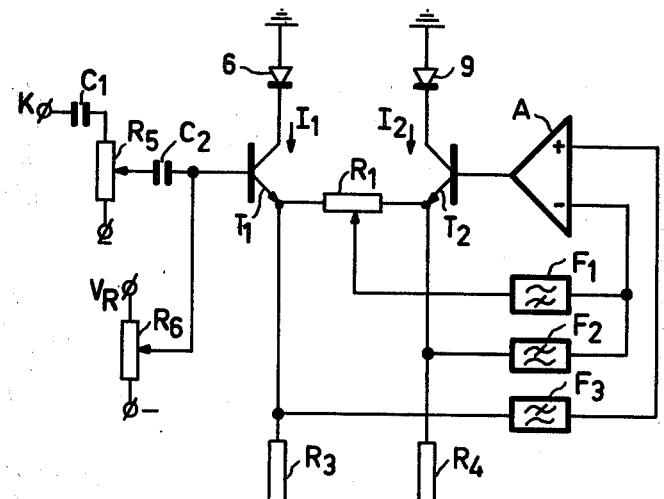
Figure 5:
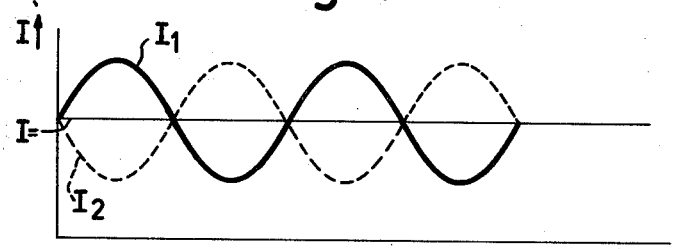

FIG. 4 shows a circuit for driving the light emitting diodes employed in the embodiment of FIG. 3, and FIG. 5 shows the variation of the drive currents for these diodes.

FIG. 1 in a perspective view shows a holder 1 to which a magnetic head 2 is secured, which in fact comprises a multitude of magnetic heads K. Along this magnetic head 2 a magnetic tape 3 is passed in a direction V, on which magnetic tape information can be recorded or read in a number of tracks corresponding to the number of heads K by cooperation with the magnetic head 2.

In order to ensure that the magnetic heads K are always aligned relative to the relevant tracks on the magnetic tape 3, positioning means are provided, comprising a drive means 4, which is capable of moving the holder 1 in a direction R. This drive means 4 receives a control signal from control means which detect the position of the holder 1 relative to the magnetic tape 3.

These control means comprise a first optical system 5, consisting of a light-emitting element 6 and a light-receiving element 7, and a second optical system 8, comprising a light-emitting element 9 and a light-receiving element 10. The two light-emitting elements 6 and 9 may for example consist of light-emitting diodes (LED's), which are energized from a power supply source 11. These elements 6 and 9 are arranged so that they each shine on one edge $S_1$ and $S_2$ of the magnetic tape. The light-receiving elements 7 and 10 may for example consist of photodiodes which are mounted on the holder 1 at a centre-to-centre distance from each other which, viewed in the direction R, is equal to the width B of the magnetic tape 3.

The radiation beams emitted by the light-emitting elements 6 and 9 towards the respective light-receiving elements 7 and 10 are partly masked by the magnetic tape 3. When the holder 1 is in the correct position relative to the magnetic tape 3, i.e. when the magnetic head 2 exactly coincides with the magnetic tape 3, the portions of the radiation beam emitted by the elements 6 and 9 which radiate past the magnetic tape 3, and are incident on the photodiodes 7 and 10 are equal, so that the output signals of the photodiodes 7 and 10 are also equal. When the holder 1 moves in the direction R, the magnetic tape will mask one of the radiation beams for a greater part and the other radiation beam for a smaller part, so that the output signals of the photodetectors 7 and 10 differs from each other.

This data is used for deriving a suitable control signal for the drive means 4. In the present embodiment, in which it is assumed that the two light-emitting elements 6 and 9 emit a continuous radiation beam, a detection device 12 has been included for this purpose, which determines the difference between the output signals of the two photodiodes 7 and 10 and which for this purpose may for example comprise a differential amplifier. The difference signal is then applied to the drive means via a servo amplifier 13 and thus corrects the position of the holder 1, i.e. of the magnetic head 2, relative to the magnetic tape 3.

The construction of the drive means 4 is irrelevant for the principle of the invention. An example of this is a magnetic system in which the holder 1 is rigidly secured to a magnet coil 1 which is disposed in a magnetic field, which coil is energized by the control signal. As a second example it is possible to secure the holder 1 to the chassis via piezoelectric bending elements, which are energized by the control signal.

In the present embodiment, the linear measuring range of the measuring system, constituted by the two optical systems corresponds to the dimension of the two photodiodes 7 and 10 in the direction R. In this embodiment it has been assumed that the two light-emitting elements 6 and 9 each emit a comparatively wide radiation beam and that the two photodiodes 7 and 10 are partly covered by the record carrier 3, i.e. each for one half in the case of a correct positioning of the holder 1. The limits of this linear measuring range, within which the output signal of the detection device 12 varies linearly with a movement of the holder 1 in the direction R, occur when one of the photodiodes 7 and 10 is fully covered by the magnetic tape 3. However, also outside said linear measuring range the present control system operates correctly, because in the case of a larger relative displacement between holder 1 and magnetic tape 3 one of the photodiodes remains fully covered, so that a maximum control signal for the drive means 4 remains available. The control system becomes inoperative only if the relative displacement between holder 1 and magnetic tape 3 is such that the two photodiodes 7 and 10 are not at all covered by the magnetic tape 3, which corresponds to a maximum permissable displacement in both directions equal to the width B of the magnetic tape 3. In practice the measuring and control range of the system shown in FIG. 1 is therefore entirely determined by the beam width of the radiation beams produced by the light emitting elements 6 and 9, which can be optimized by the choice of the light-emitting elements 6 and 9 and, as the case may be, by lenses which are coupled thereto. In this respect the use of lenses is useful in order to ensure that each of the emitted radiation beams, as far as possible, is a parallel beam with a most homogeneous light distribution.

If light-emitting elements with a smaller beam width of the emitted radiation beam are to be used, the light-emitting elements 6 and 9 can be made to move along with the holder 1, i.e. by also moving the drive means in the direction R. For the light-emitting elements 6 and 9 light guides (fibers) may then for example be used, which results in the embodiment as schematically shown in cross section in FIG. 2. Corresponding elements in this Figure bear the same reference numerals as in FIG. 1.

The construction of the holder 1 with magnetic head (not shown) and the photodiodes 7 and 10 is identical to that in accordance with FIG. 1. In contradistinction to the embodiment of FIG. 1 the light-emitting elements 6 and 9 are now accommodated in a second holder 15 which is rigidly coupled to the holder 1 and which can thus also be moved in the direction R by the drive means 4. These light-emitting elements 6 and 9 now consist of light guides (fibres) whose ends are fixed in the holder 15. The other end of each of these light guides may be connected to an individual light source, but because the two light guides in the present embodiment always emit light the same time, it is possible to employ a common light source 16 for the two light guides, which is driven by a power supply source 11. The control signal for the drive means 4 can be obtained in a manner identical to that shown in FIG. 1 with the aid of the detection device 12 and the servo-amplifier 13.

Owing to the rigid coupling between the holder 15 and the holder 1 it is achieved that the beam width of the radiation beams emitted by the light-emitting elements 6 and 9 no longer limits the measuring and control range of the system, so that in this embodiment the control range corresponds to twice the width B of the record carrier.

In the embodiment of FIG. 2 a modulation device 20 is included between the light-emitting diode 16 and the power supply source 11, which device receives a modulation signal from an oscillator 19. This modulation device 20 serves to ensure that the light-emitting elements 6 and 9 do not emit a continuous radiation beam but a periodically varying radiation beam. The form of this periodic variation is not essential. As an example, the light-emitting diode 16 may be energized with a direct current with a sinusoidal alternating current superimposed on it, which results in radiation beams which in addition to a continuous luminous intensity exhibit a sinusoidally varying light intensity. Instead of a sinusoidal variation it is also possible to vary the luminous intensity in accordance with a squarewave. In the lastmentioned case it is even possible to operate the light-emitting diode intermittently by dispensing with the d.c. component, i.e. to turn it on and off periodically. In order to derive a suitable control signal for the drive means 4 from the sum signal supplied by the detection device 12, it is necessary to apply said sum signal to a synchronous detector 18 which also receives the control signal for the modulation device 20, i.e. the signal with a frequency equal to the modulation frequency, from the oscillator 19. The output signal of this synchronous detector 18 is then again representative of the magnitude and the direction of the positional error of the holder 1.

The use of a varying intensity of the radiation beams first of all has the advantage that only a.c. amplifiers need be used in the control loop. A far more important advantage is obtained in respect of the elimination of the influence of stray light on the position measurement. It will be evident that stray light which is incident on the two photodiodes 7 and 10 in unequal amounts provides a contribution to the sum signal of the detection device 12 and thus impairs the position measurement. Generally, this stray light will give rise to a d.c. component in said sum signal but in addition an a.c. component, for example in the case of artificial light. By selecting the modulation frequency for the variation of the radiation beam sufficiently high, for example 100 kHz and by including a band-pass filter 14 with a pass-band around said modulation frequency in the connection between the detection device 12 and the synchronous detector 18 the contribution in the sum signal of the detection device caused by stray light is blocked, so that the effect of stray light on the measurement is fully eliminated.

FIG. 3 shows an embodiment of the apparatus in accordance with the invention employing two individual light-emitting diodes 6 and 9. By means of a modulation device 20, included between these light-emitting diodes 6 and 9, and the power supply source 11 and the oscillator 19, it is again ensured that the light-emitting diodes 6 and 9 emit a radiation beam which varies with the modulation frequency. However, in contradistinction to the embodiment of FIG. 2, in which the variations of the two radiation beams are in phase, the two light-emitting diodes 6 and 9 are now driven in phase opposition, so that the variations of the radiation beams are also in phase opposition.

In the holder 1 the two light-receiving elements 7 and 10 are again arranged opposite the light-emitting diodes 6 and 9, which light-receiving elements are constituted by two light guides (fibres) in the present embodiment. These two light guides are coupled to a common photodiode 17 whose output signal consequently represents the sum of the amounts of light receiving by the two light-guides. When the magnetic tape 3 is situated halfway between the ends of the two light guides 7 and 10, these two light guides receive unequal amounts of light at substantially any instant, but the sum of these amounts of light is constant, which means that the output signal of the photodiode 17 is then constant. If the magnetic tape has shifted relative to this desired position, the photodiode 17 supplies an output signal with an a.c. component of a frequency equal to the modulation frequency (for example 100 kHz), whose amplitude is a measure of the magnitude of the positional error between the magnetic head and the magnetic tape, whilst the phase relative to the modulation signal for the modulation device 20 indicates the directions of the positional error. The control signal for the drive means 4 can therefore be obtained by applying the output signal of said photodiode 17 to a synchronous detector 18, which also receives the modulation signal supplied by the oscillator 19. In order to eliminate the influence of stray light, a band-pass filter 14 with a passband around the modulation frequency (100 kHz) can again be included between the photodiode 17 and said synchronous detector 18.

Instead of the two light guides 7 and 10 it is obviously also possible to accommodate two separate photodiodes in the holder 1 in the present embodiment, and to sum the output signals of these photodiodes electrically. Furthermore, it will be evident that in respect of the location of the light-emitting elements 6 and 9 and the light-receiving elements 7 and 10 relative to each other, there are many variants, which not only applies in respect of the embodiment shown in FIG. 3 but also in respect of the embodiments in accordance with FIGS. 1 and 2. For example it is readily possible to replace the light-receiving elements 7 and 10 in the holder 1 by one or both light-emitting elements 6 and 9. The two elements which are not placed on the holder 1 may then optionally be rigidly coupled to the drive means 4, i.e. so that they move along with the holder 1.

It will be evident that for the accuracy of the systems shown it is essential that the two optical channels of the measuring system are, as far as possible, identical. A deviation between these two optical channels can be compensated for by adjustment of the drive of the light-emitting elements or of the detection device.

FIG. 4 shows a circuit for driving the light-emitting diodes 6 and 9 used in the embodiment of FIG. 3, by means of which said adjustment is possible. This circuit includes the transistors $T_1$ and $T_2$, whose emitters are interconnected via a resistor $R_1$ and are also connected to the negative terminal of the supply voltage source via resistors $R_3$ and $R_4$. The light-emitting diodes 6 and 9 are connected to the collectors of these transistors $T_1$ and $T_2$ and receive control currents $I_1$ and $I_2$ from these transistors.

To the base of transistor $T_1$ a control signal is applied which consists of a d.c. component and an a.c. component. The d.c. component is derived from a reference voltage $V_R$ via a voltage divider $R_6$. The a.c. component is derived from the modulation signal of the oscillator 19 (FIG. 3) applied to input terminal K via the isolating capacitors $C_1$ and $C_2$ and the voltage divider $R_5$. By adjusting the voltage dividers $R_5$ and $R_6$ the ratio between the amplitude of the a.c. component and the value of the d.c. component can be adjusted, the amplitude of the a.c. component being selected to be smaller than the d.c. component.

The base of transistor $T_2$ receives a control signal from an operational amplifier A. The emitter of transistor $T_1$ is connected to the non-inverting input (+) of said operational amplifier A via a low-pass filter $F_3$, whilst the emitter of transistor $T_2$ is connected to the inverting input (−) of said operational amplifier A via a low-pass filter $F_2$. Thus it is achieved that the direct voltages on the emitters of the transistors $T_1$ and $T_2$ are necessarily equal and thus also the direct currents through these transistors $T_1$ and $T_2$. This means that the drive currents $I_1$ and $I_2$ for the light-emitting diodes 6 and 9 contain equal d.c. components $I=$, as is indicated in FIG. 5.

Thus, one of the most important conditions is created to ensure that the light-emitting diodes emit equal amounts of light. The amount of light emitted by a light-emitting diode substantially depends on two factors, i.e. the temperature and the drive current. Since the two light-emitting diodes receive the same direct current their dissipations are equal. By ensuring that the thermal resistance between the two diodes is small, for example by including them in a common cooling body, it is ensured that the two diodes have the same temperature with a high accuracy.

The a.c. component of the drive current $I_1$ is directly derived from the modulation signal applied to the terminal K. The a.c. component of the drive current $I_2$ is determined by connecting the tapping point of the resistor $R_1$ to the inverting input (−) of the operational amplifier A via a high-pass filter $F_3$. Thus it is achieved that the alternating voltage on the emitter of transistor $T_2$ is exactly in phase opposition to the alternating voltage on the emitter of transistor $T_1$, the ratio of the amplitudes of these two alternating voltages being determined by the adjustment of the tapping of the resistor $R_1$. Thus both the phase relationship of the a.c. components of the drive currents $I_1$ and $I_2$ and their amplitude ratio are accurately defined.

The circuit can be adjusted simply when the control loop is interrupted before the record carrier 3 is inserted. In that case the control signal for the drive means should be zero. If this is not the case owing to an inequality in the optical paths, said control signal need merely be reduced to zero by changing the tapping point of the resistor $R_1$, i.e. by changing the ratio of the a.c. components of the drive currents for the light-emitting diodes.

Obviously the light output of the light-emitting diodes can be further stabilised inter alia by means of negative feedback. This can be effected fully electrically, but, if desired also partly optically, for example by tapping a part of each of the radiation beams with the aid of light guides, summing these and converting them into an electric feedback signal for the control circuit via a synchronous detector.

As has been indicated for the embodiment described with reference to FIG. 1 the magnetic head 2 may comprise a multitude of adjacently disposed heads K, which each cooperate with a separate track of the record carrier. In this case it is possible to record a multitude of different information signals on the record carrier at the same time. However, this arrangement is equally suitable for recording one information signal only. The available storage capacity of the record carrier can then simply be utilized in an optimum manner by applying the information signal to a different (adjacent) head K when the end of the record carrier is reached and simultaneously reversing the direction of movement of the record carrier, so that adjacent tracks on the record carrier can be recorded consecutively. Obviously, it is also possible to use a single magnetic head in this embodiment, which head when the end of the record carrier is reached is subjected to a displacement equal to the desired track distance between the tracks on the record carrier transverse to the direction of movement.

What is claimed is:

1. Apparatus for recording and/or reproducing information in a plurality of parallel tracks on a magnetic record carrier in the form of a tape, which apparatus comprises a magnetic head which is adapted to cooperate with the record carrier which is passed along this magnetic head, positioning means for controlling the relative position of the magnetic head with respect to the record carrier in a direction transverse to the direction of transport of the record carrier and in a plane parallel to the plane of the record carrier, and control means for generating and applying to the positioning means a control signal which is representative of the difference between the instantaneous and the desired position of the magnetic head, characterized in that the control means are provided with a first and a second optical system, each comprising a light-emitting element for emitting a radiation beam against an individual edge of the record carrier and a light-receiving element for receiving the amount of light from the radiation beam emitted by the associated light-emitting element which shines past the record carrier, at least one of the said two elements of each optical system being rigidly connected to the magnetic head, and the control means furthermore being provided with a detection device which is coupled to the light-receiving elements of the two optical systems for generating the control signal for the positioning means in dependence on the relative magnitude of the amounts of light received by the two light-receiving elements.

2. Apparatus as claimed in claim 1, characterized in that each of the two optical systems comprises a light transducer for converting the amount of light received by the light-receiving element of the relevant optical system into an electric output signal, and that the detection device is provided with an adder circuit for adding the output signals of the two light transducers to each other with opposite polarity.

3. Apparatus as claimed in claim 2, characterized in that the light-emitting elements of the two optical system are coupled to a modulation device for the in-phase variation of the intensity of the radiation beams emitted by the two light emitting elements with a modulation frequency and that the detection device for deriving the control signal comprises a synchronous detector, to which the sum signal from the adder circuit and a signal derived from the modulation device, having a frequency equal to the modulation frequency, are applied.

4. Apparatus as claimed in claim 2 or 3, characterized in that the light-emitting element of each of the two optical systems consists of a light guide and that these two light guides are optically coupled to a common light source.

5. Apparatus as claimed in claim 1, characterized in that the light-emitting elements of the two optical systems are coupled to a modulation device for varying the intensity of the radiation beams emitted by the two light-emitting elements with a modulation frequency in phase opposition, and that the detection device is adapted to supply an electric sum signal which represents the sum of the amounts of light received by the two light-receiving elements, whilst said detection device furthermore comprises a synchronous detector, to which this electric sum signal and a signal derived from the modulation device, having a frequency equal to the modulation frequency, are applied.

6. Apparatus as claimed in claim 5, characterized in that the light-receiving element of each of the two optical systems consists of a light guide, and that the detection device comprises a light transducer with which the two light guides are optically coupled and at whose output the electric sum signal is available.

7. Apparatus as claimed in claim 3, 5 or 6, characterized in that the detection device comprises a band-pass filter having a pass-band round the modulation frequency, via which band-pass filter the electric sum signal is applied to the synchronous filter.

* * * * *